United States Patent [19]
Mao

[11] Patent Number: 4,618,035
[45] Date of Patent: Oct. 21, 1986

[54] COLLAPSIBLE AND MOVABLE SUPPORT FOR WARDROBE

[76] Inventor: James Mao, 2nd Fl., No. 7-3, Jen-Ai Road, Sec. 3, Taipei, Taiwan

[21] Appl. No.: 721,440

[22] Filed: Apr. 9, 1985

[51] Int. Cl.$^4$ ............................ A45C 5/14; B62B 1/12
[52] U.S. Cl. ............................... 190/18 A; 206/287.1; 280/37; 280/47.29; 280/655
[58] Field of Search ............ 190/18 A, 18 R; 280/37, 280/47.29, 655; 206/287.1, 287

[56] References Cited

U.S. PATENT DOCUMENTS

| | | | |
|---|---|---|---|
| 3,998,476 | 12/1976 | Kazmark, Sr. | 280/655 |
| 4,062,429 | 12/1977 | Tabor et al. | 190/18 A |
| 4,221,402 | 9/1980 | Kazmark | 280/655 X |
| 4,248,453 | 2/1981 | Stark | 280/655 |
| 4,299,403 | 11/1981 | Brewer et al. | 280/655 X |

FOREIGN PATENT DOCUMENTS

| | | | |
|---|---|---|---|
| 132016 | 1/1985 | European Pat. Off. | 190/18 A |
| 2359229 | 6/1975 | Fed. Rep. of Germany | 190/18 A |

Primary Examiner—William Price
Assistant Examiner—Sue A. Weaver

[57] ABSTRACT

This invention relates to a collapsible and movable support for wardrobe comprising a collapsible main frame consisting of two parallel frames, each of which having three hollow tubes connected one after another, a bottom plate to which the lower ends of said main frame are secured being provided on the underside with a pair of wheels, a supporting means pivotally secured to said bottom plate and opposite to said wheels, and a wardrobe capable of being secured to said main frame and said bottom plate hence to provide a collapsible and movable support for wardrobe for the users.

1 Claim, 13 Drawing Figures

COLLAPSIBLE AND MOVABLE SUPPORT FOR WARDROBE

BACKGROUND OF THE INVENTION

This invention relates to a collapsible and movable support for wardrobe.

Conventional wardrobes are not suitable for travelling use owing to inconvenient transportation.

It is, therefore, an object of the present invention to obviate the above-mentioned drawback.

SUMMARY OF THE INVENTION

It is the primary object of the present invention to provide a collapsible and movable support for wardrobe wherein a wardrobe can be secured to a collapsible and movable support hence to be suitable for travelling use.

It is another object of the present invention to provide a collapsible and movable support for wardrobe wherein the main frame of the support is collapsible and can be received in the receiving pocket of the wardrobe for a pleasing appearance.

It is still another object of the present invention to provide a collapsible and movable support for wardrobe wherein the wardrobe can be folded up to provide a flexible use for the users.

DETAILED DESCRIPTION OF THE PREFERRED EMBODIMENT

Figure 1:
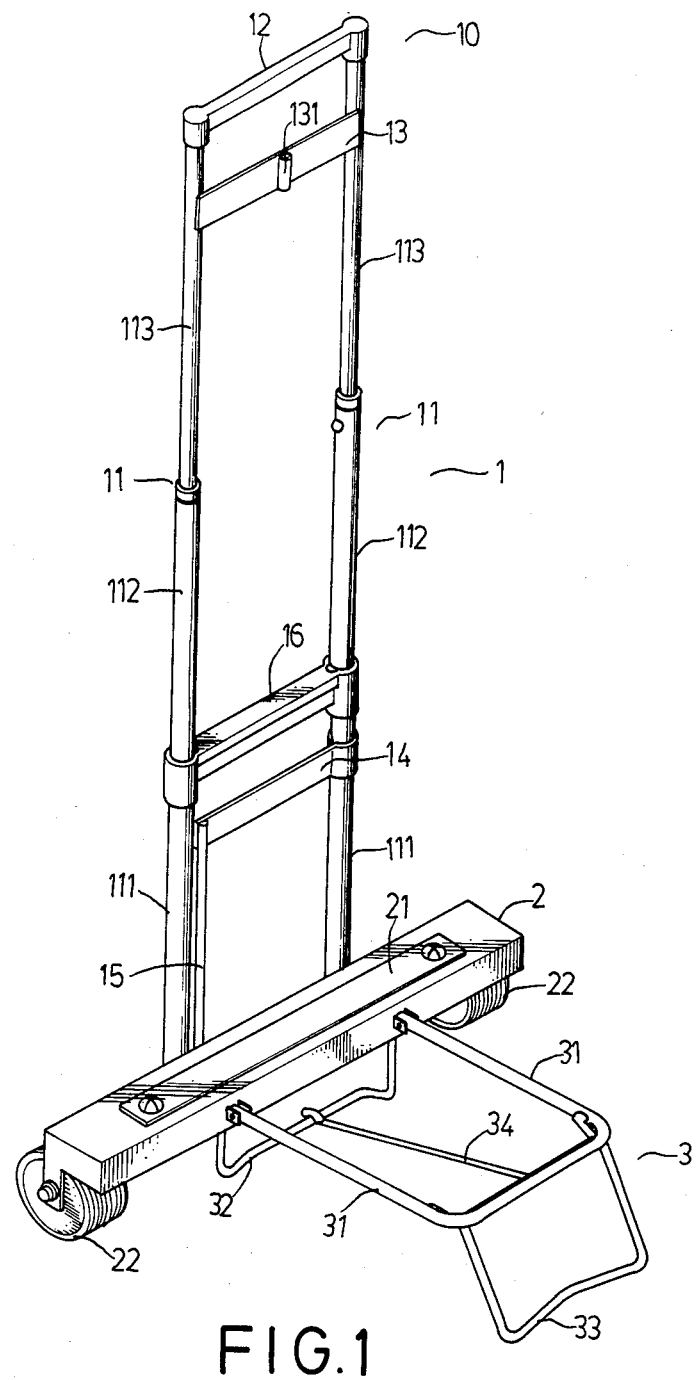
FIG. 1 is a perspective view of a support according to a preferred embodiment of the present invention.

Referring to the drawings and particularly to FIG. 1, a collapsible and movable support (10) comprises a main frame (1), a bottom plate (2) and a supporting means (3) pivotally connected to said bottom plate (2).

Said main frame (1) comprises a pair of frames (11) parallel to each other, and each of said frames (11) consists of three hollow tubes preferably made of metal wherein a first tube (111) is secured at the lower end to the front side of said bottom plate (2) and the upper end thereof is connected to the lower end of a second tube (112) and the upper end of said second tube (112) is connected to the lower end of a third tube (113). A first handle (12) is connected to the top ends of said third tubes (113) of said frames (11) and secured thereto by means of screws or other suitable means. A first transverse means (13) provided at its central portion with a socket (131) is connected to the upper ends of said third tubes (113) slightly below said first handle (12) and secured thereto, a supporting bar (15) is secured at the lower end to the lower end of one of said first tubes (111) and extends upwardly to a predetermined distance and a second transverse means (14) is connected to the upper ends of said supporting bar (15) and the other one of said first tubes (111). A fixing means (16) is movably disposed on the intersections of the first tubes (111) and the second tubes (112 and is slightly above said second transverse means (14).

A bottom plate (2) to which the lower ends of said first tubes (111) are secured comprises a first fixing plate (21) capable of being secured to the upper side of said bottom plate (2) by means of screws or other suitable means and a pair of wheels (22) are disposed on both sides of the underside of said bottom plate (2).

A supporting means (3) pivotally connected to said rear side of said bottom plate (2) and opposite to said wheels (22) comprises two parallel arms (31) pivotally joined to the rear side of said bottom plate (2), a first leg (32) fixedly secured to the rear side of the underside of said bottom plate (2) and opposite to said wheels (22), a second leg (33) pivotally connected to said arms (31) and opposite to said first leg (32) and a connecting bar (34) connected between said first and second legs (32) (33) to provide a proper stress hence to make the supporting means (3), as shown in FIG, easily stretched up or collapsed and to be capable of respectively fixing said supporting means (3) in above-mentioned positions.

Figure 4:
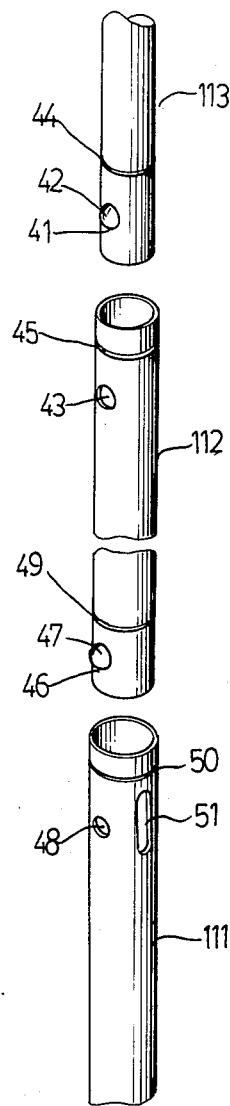
FIG. 4 is a perspective fragmental view of a collapsible frame according to the present invention.

Now referring to FIG. 4, said third hollow tube (113) is provided at the lower end with a first hole (41) and a first spring-loaded ball (42) received in said third tube (113) may project therefrom. A first circular flange (44) is formed in the outer wall of said third tube (113) slightly above said first hole (41) thereof. Said second hollow tube (112) is furnished at the upper end with a second hole (43) corresponding to said first hole (41) and first spring-loaded ball (42) of said third tube (113) and a second circular flange (45) corresponding to said first circular flange (44) is formed in the inner wall of said second tube (112) slightly above said second hole (43) thereof. Said third tube (113) with a smaller diameter and a shorter length in contrast to said second tube (112) may be connected thereto in such a manner that the upper end of said third tube (113) is inserted into the lower end of said second tube (112) and moved upwardly therein until the first spring-loaded ball (42) corresponds to said second hole (43) and partly projects out thereof meanwhile said first circular flange (44) can lean against said second circular flange (45) to further prevent said third tube (113) from passing out of said second tube (112) hence to make said third tube (113) fixedly joined to said second tube (112). Said second tube provided at the lower end with a third hole (46) and a second spring-loaded ball (47) received in said second tube (112) may project therefrom. A third circular flange (49) is formed in the outer wall of said second tube (112) slightly above said third hole (46) thereof. Said first hollow tube (111) is furnished at the upper end with a fourth hole (48) corresponding to said third hole (46) and said second spring-loaded ball (47) of said second tube (112) and a fourth circular flange (50) corresponding to said third circular flange (49) is formed in the inner wall of said first tube (111) slightly above said fourth hole (48) thereof. Said second tube (112) with a smaller diameter and a shorter length in contrast to said first tube (111) can be connected thereto in such a manner that the upper end of said second tube (112) is inserted into the lower end of said first tube (111) and moved upwardly therein until said second spring-loaded ball (47) corresponds to said fourth hole (48) and partly projects out thereof meanwhile said third circular flange (49) can lean against said fourth circular flange (50) to further prevent said second tube (112) from passing out of said first tube (111) hence to make said second tube (112) fixedly joined to said first tube (111).

Figure 5:
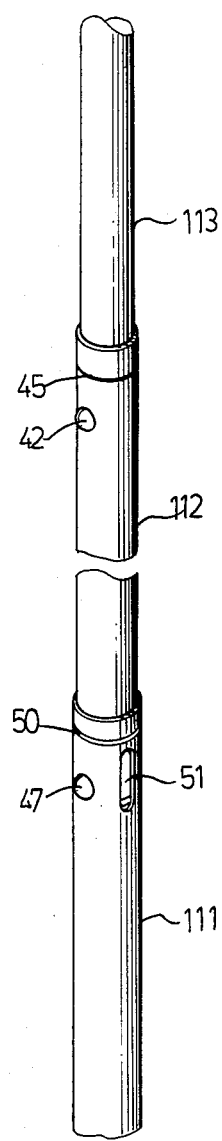
FIG. 5 is a perspective view of FIG. 4.

FIG. 5 illustrates that the third tube (113) is fixedly connected to the second tube (112) by means of the first spring-loaded ball (42) associated with said first and second circular flanges (44) and (45) while the second tube (112) is fixedly joined to the first tube (111) via the second spring-loaded ball (47) associated with said third and fourth circular flanges (49) and (50) hence to form a collapsible frame (11).

Figure 6:
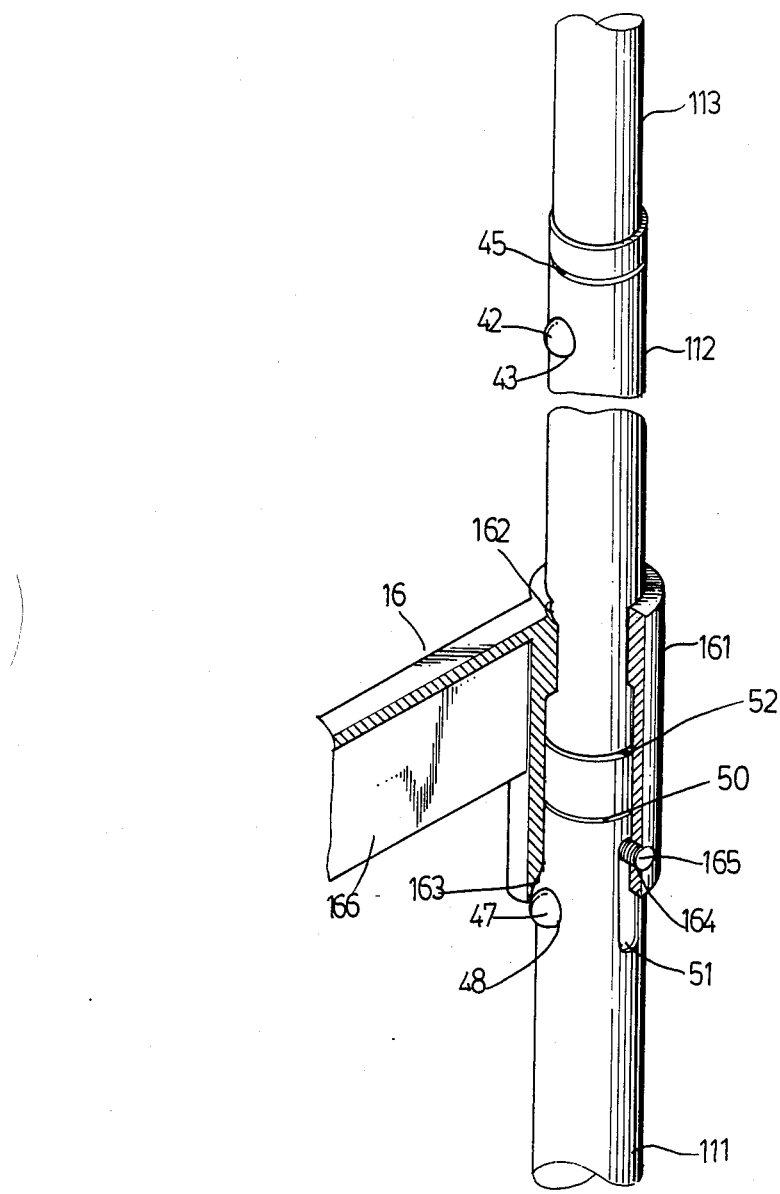
FIG. 6 is a perspective view of a fixing means cooperated with a collapsible frame as shown in FIG. 4 wherein said fixing means is in a first fixing position.

FIG. 6 illustrates one of said frames (11) wherein said first tube (111) is further provided near said fourth hole (48) with a slot (51). A fixing means (16) comprising a plate member (166) and a pair of sleeves (161) formed at the both sides thereof (only one sleeve shown in FIG. 6) is disposed on the intersections (52) of said second tubes (112) and said first tubes (111) of said frames (11). Said sleeves (161) respectively surround the lower ends of said second tubes (112) and the upper ends of said first tubes (111). Each of said sleeves (161) is provided at the margins of both ends with a first recess (162) and a second recess (163) which respectively correspond to said first and second spring-loaded balls (42) and (47) and at the periphery with an aperture (164) corresponding to said slot (51) of said first tube (111) and a screw (165) may pass through said aperture (164) and be inserted into said slot (51).

When the main frame (1) according to the present invention intends to be stretched up, the user can pull the first handle (12) of said main frame (1) upwardly and lift up said fixing means (16) to its first position as shown in FIG. 6, and at this moment said screw (165) will reach the upper edge of said slot (51) to limit the upward motion meanwhile both the first and second spring-loaded balls (42) and (47) will respectively project from said second and fourth holes (43) and (48) hence to provide rigid connections among said first, second and third tubes (111) (112) and (113).

Figure 7:
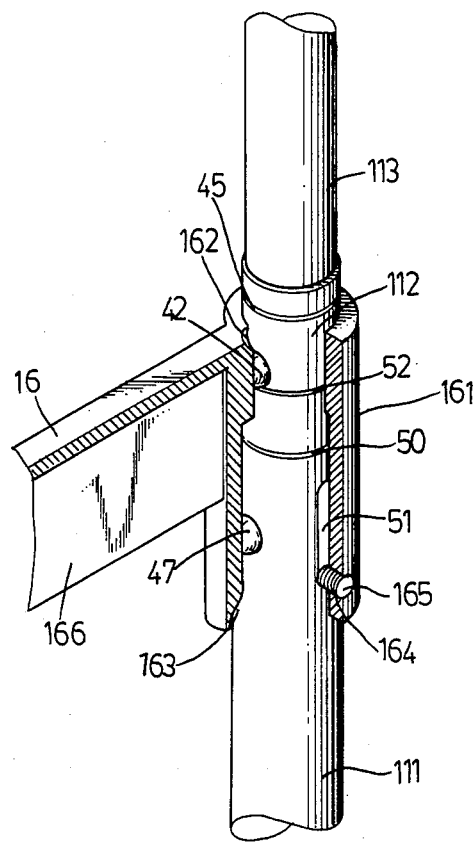
FIG. 7 is a perspective view of a fixing means cooperated with a collapsible frame as shown in FIG. 4 wherein said fixing means is in a second fixing position.

In folding up the main frame (1), said fixing means (16) can be pessed downwardly and reach its second position, as shown in FIG. 7 wherein said screw (165) reaches the lower edge of said slot (51) to limit the downward motion and said second spring-loaded ball (47) is pressed into and received within said second tube (112) by means of said second recess (163) thereof and hence said second tube (112) can be pressed downwardly and capable of being received within said first tube (111). As soon as said second tube (112) moves down to a predetermined distance, the first spring-loaded ball (42) will be pressed into and received within said third tube (113) by means of said first recess (162) of said fixing means (16) and hence said third tube (113) can be pressed downwardly to be received within said second tube (112).

Figure 2:
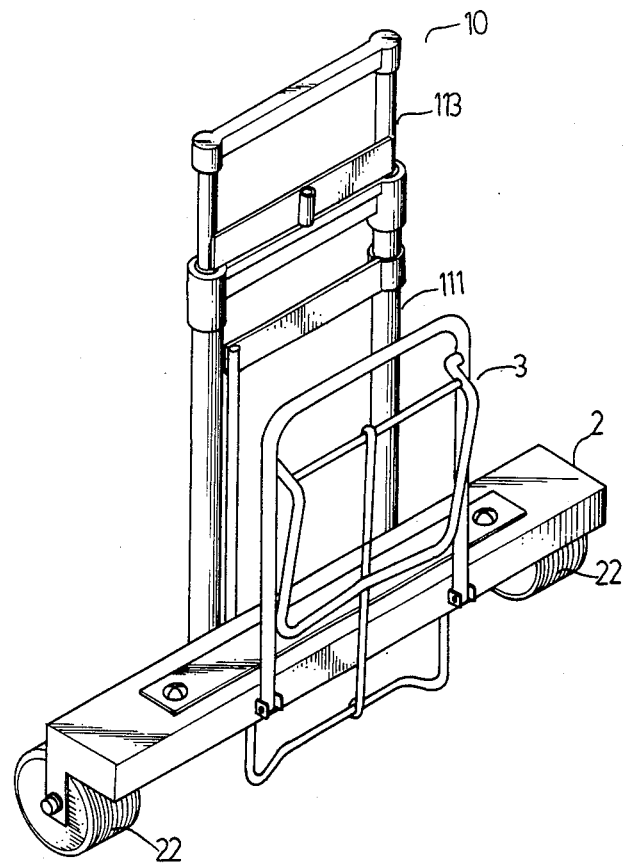
FIG. 2 is a perspective view of a support as shown in FIG. 1 wherein said support is in a collapsed state.
Figure 3:
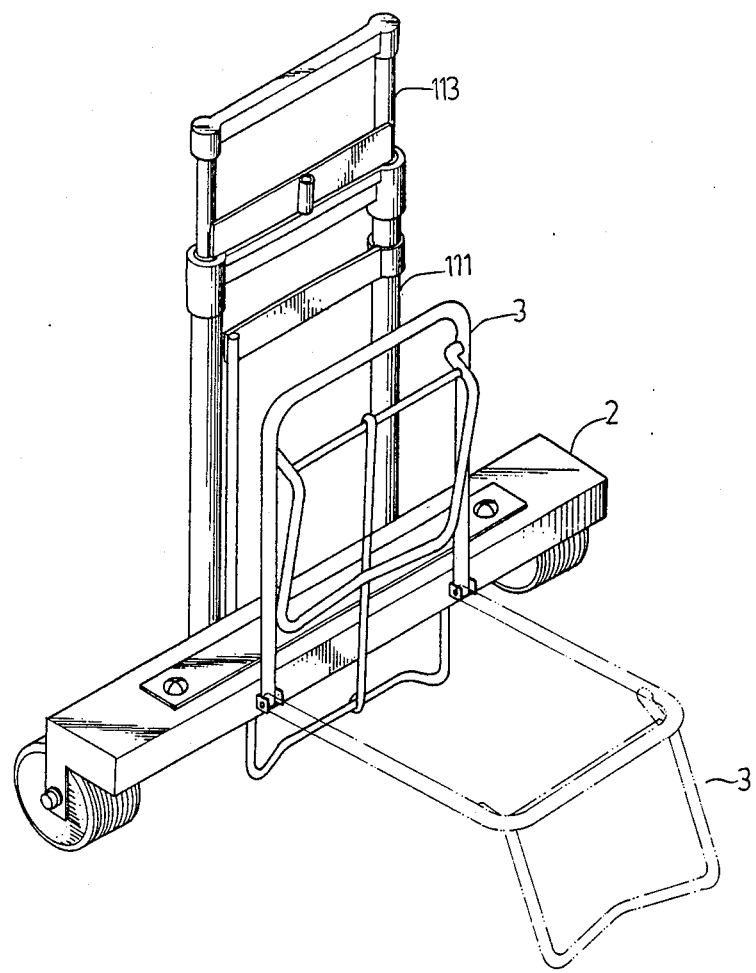
FIG. 3 is a perspective view of a support wherein a supporting means can be collapsed or stretched up.

Finally, as shown in FIG. 2 said support (10) according to the above-described procedures may be collapsed to a compact form and hence can save the space and facilitate transportation.

Figure 8:
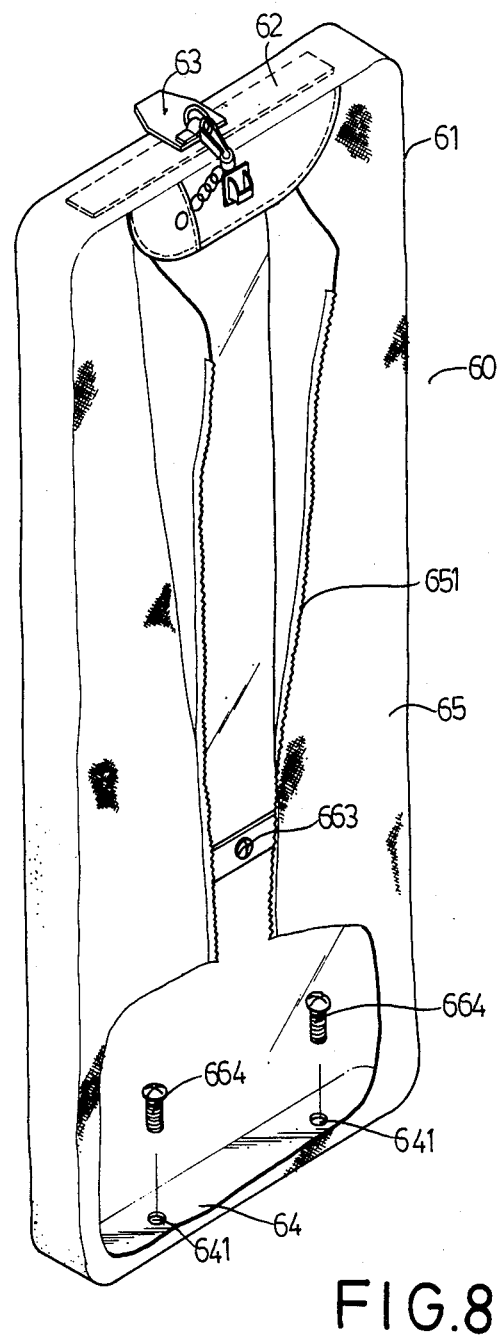
FIG. 8 is a front view of a wardrobe according to a preferred embodiment of the present invention.
Figure 9:
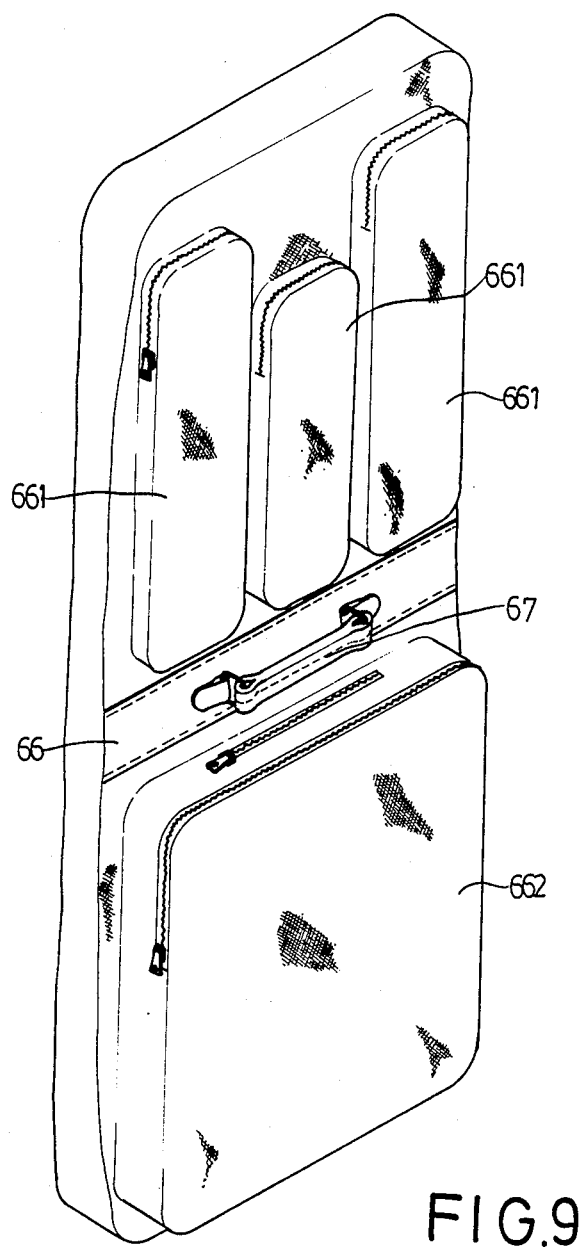
FIG. 9 is a rear view of FIG. 8.

Referring to FIGS. 8 and 9, a wardrobe (60) according to the present invention comprises a main body (61) of rectangular shape. A supporting plate (62) is disposed on the inner wall of the top of said main body (61) and a hook member (63) corresponding to said socket (131) of said first transverse means (13) of said main frame (1) is secured to the top of said supporting plate (62). The bottom face (64) of said main body (61) is provided with a plurality of fixing holes (641) through which a plurality of corresponding screws (664) may pass and the front cover (65) thereof is provided with zipper (651) to be capable of opening or closing said front cover (65) and the rear face (66) thereof is furnished at the upper outer wall with a plurality of pockets (661) and at the lower outer wall with a receiving pocket (662) and further at the middle outer wall with a second handle (67). A second fixing plate (663) is disposed on the inner wall of said rear face (66) and corresponds to said second transverse means (14) of said main frame (1) of said support (10).

Figure 10:
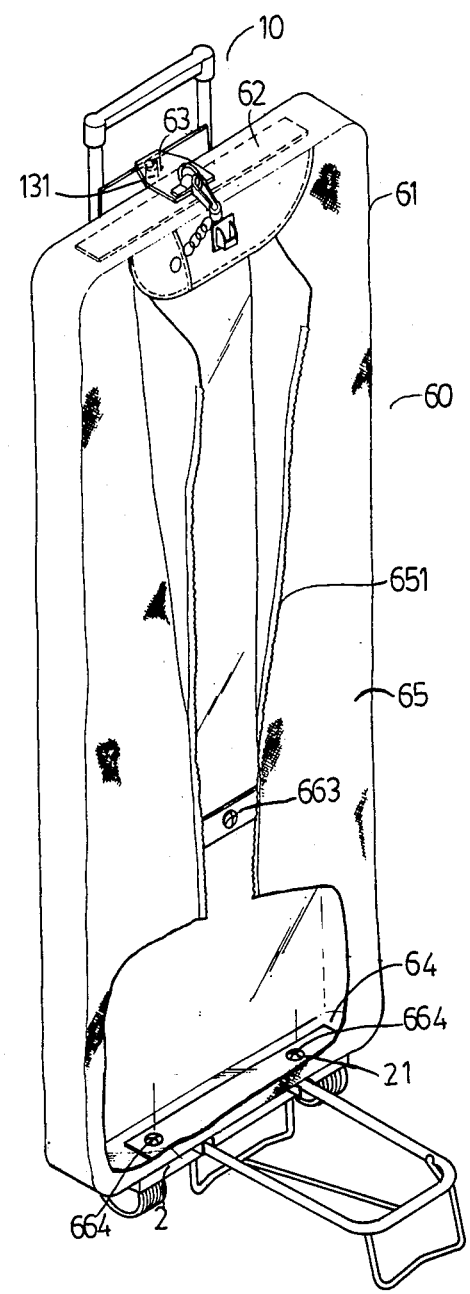
FIG. 10 illustrates a wardrobe secured to a support according to a preferred embodiment of the present invention.

Referring to FIG. 10 said wardrobe (60) can be secured to said support (10) in such a manner that the bottom face (64) of said wardrobe (60) is clamped between said bottom plate (2) and said fixing plate (21) thereof and secured therein by means of said screws (664) or other suitable means and said second fixing plate (663) is secured to said second transverse means (14) (not shown in FIG. 10) thereof by means of screws or other suitable means and said hook member (63) is inserted in and received within said socket (131) thereof so that said wardrobe (60) may be fixedly secured to said support (10) without shaking or shifting. Furthermore, as shown in FIG. 12, the lower portion of said main frame (1) of said support (10) is received within said receiving pocket (662) of said wardrobe (60) so that if desired said main frame (1) can be collapsed and received in said receiving pocket (662) thereof.

Figure 11:
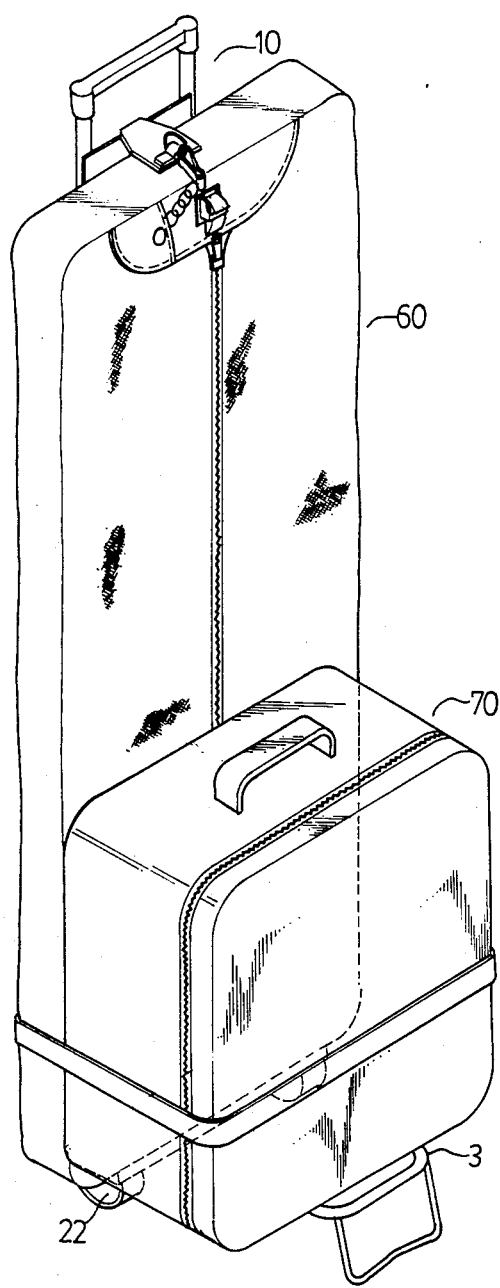
FIG. 11 is a perspective view of a first embodiment of the present invention.

It is a first embodiment of the present invention as shown in FIG. 11, wherein the support (10) is stretched up to cooperate with the wardrobe (60) and a trunk (70) can further be placed on the supporting means (3) of said support (10) hence to provide a convenient transportation for the users.

Figure 12:
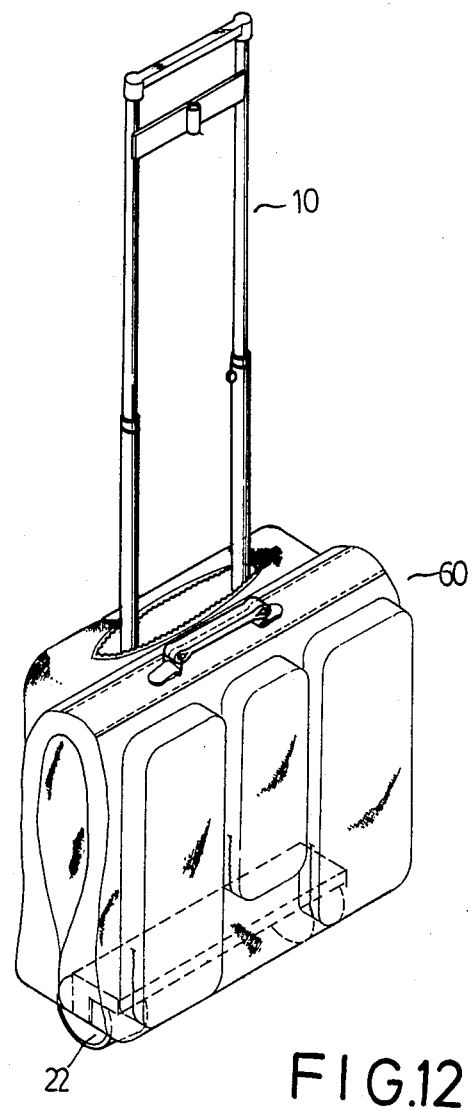
FIG. 12 is a perspective view of a second embodiment of the present invention.

It is a second embodiment of the present invention as shown in FIG. 12, wherein said wardrobe (60) can be folded up to provide another flexible use for the users.

Figure 13:
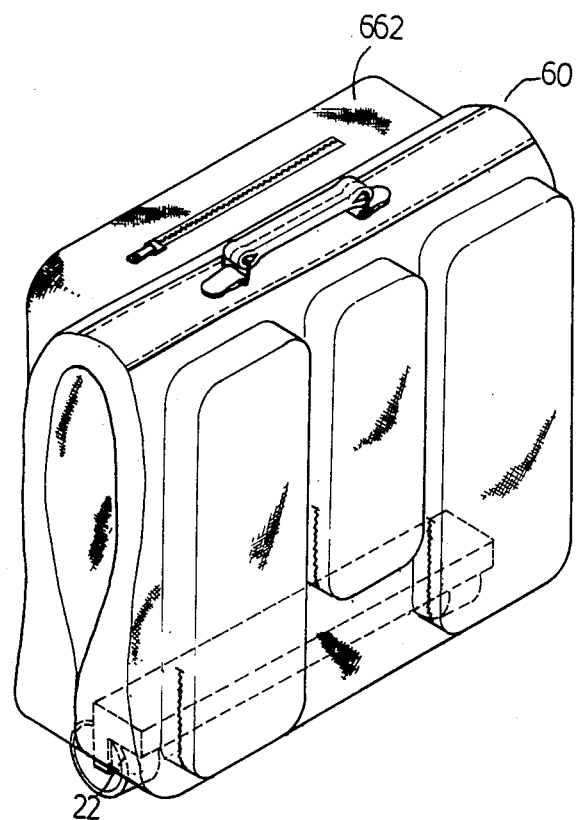
FIG. 13 is a perspective view of a third embodiment of the present invention.

It is a third embodiment of the present invention as shown in FIG. 13 wherein the main frame (1) of the support (10) can be collapsed and received within the receiving pocket (662) of the wardrobe (60) to provide a pleasing appearance.

I claim:

1. A collapsible and movable support for wardrobe comprising:
   a main frame comprising a pair of frames parallel to each other, each of said frame consisting of a first, a second and a third hollow tubes, said third tube provided at the lower end with a first hole, a first spring-loaded ball received in said third tube capable of projecting from said first hole thereof, a first circular flange formed in the outer wall of said third tube slightly above said first hole thereof, said second tube furnished at the upper end with a second hole corresponding to said first hole and said first spring-loaded ball of said third tube, a second circular flange corresponding to said first circular flange being formed in the inner wall of said second tube slightly above said second hole thereof, said third tube with a smaller diameter and a shorter length in contrast to said second tube capable of being connected at the lower end to the upper end of said second tube, said second tube further provided at the lower end with a third hole, a second spring-loaded ball received in said second tube capable of projecting from said third hole thereof, a third circular flange formed in the outer wall of said second tube slightly above said third hole thereof, said first tube furnished at the upper end with a fourth hole corresponding to said third hole and said second spring-loaded ball of said second tube, a fourth circular flange corresponding to said third circular flange being formed in the inner wall of said first tube slightly above said fourth hole thereof, said second tube with a smaller diameter and a shorter length in contrast to said first tube capable of being connected at the lower end to the upper end of said first tube, said first tube further provided near said fourth hole thereof with a slot;
- a first handle secured to the top ends of said third tubes of said frames;
- a first transverse means provided at the central portion with a socket secured to the upper ends of said third tubes slightly below said first handle;
- a supporting bar secured to the lower end of one of said first tubes and extending upwardly to a predetermined distance;
- a second transverse means secured to both the upper end of said supporting bar and the upper end of the other one of said first tubes;
- a fixing means comprising a plate member and a pair of sleeves formed at the both sides of said plate member, each of said sleeves provided at the margins of both ends with a first recess and a second recess respectively corresponding to said first and second spring-loaded balls and at the periphery with an aperture corresponding to said slot of said first tube, a screw capable of passing through said aperture and being inserted into said slot, said fixing means capable of being movably disposed on the intersections of said first and second tubes of said main frame and above said second transverse means thereof;
- a bottom plate to which the lower ends of said first tubes are secured comprising a first fixing plate capable of being secured to the upper side of said bottom plate and a pair of wheels disposed on both sides of the underside of said bottom plate;
- a supporting means pivotally connected to the rear side of said bottom plate and opposite to said wheels comprising a pair of parallel arms pivotally joined to the rear side of said bottom plate, a first leg fixedly secured to the rear side of the underside of said bottom plate and opposite to said wheels, a second leg pivotally connected to said arms and opposite to said first leg and a connecting bar connected between said first and second legs;
- a wardrobe comprising a main body, a supporting plate disposed on the inner wall of the top of said main body, a hook member corresponding to said socket of said first transverse means of said main frame being secured to the top of said supporting plate, the bottom face of said main body provided with a plurality of fixing holes through which a plurality of corresponding fastening means may pass and the front cover thereof provided with at least one zipper to open or close said front cover and the rear face thereof furnished on the upper outer wall with a plurality of pockets and on the lower outer wall with a receiving pocket, a second handle disposed on the middle portion of the outer wall of said rear face, a second fixing plate disposed on the inner wall of said rear face and corresponding to said second transverse means of said main frame, said wardrobe capable of being secured to said main frame and said bottom plate.

* * * * *